United States Patent [19]

Ubels et al.

[11] Patent Number: 4,881,566

[45] Date of Patent: Nov. 21, 1989

[54] METHOD FOR REDUCING PRESSURE DROP IN THE TRANSPORTATION OF DRAG REDUCER

[75] Inventors: Sibrand A. Ubels, Waterloo, Belgium; Steven L. Baxter, Ponca City, Okla.

[73] Assignee: Conoco Inc., Ponca City, Okla.

[21] Appl. No.: 256,806

[22] Filed: Oct. 11, 1988

[51] Int. Cl.$^4$ .............................................. F17D 1/16
[52] U.S. Cl. ...................................................... 137/13
[58] Field of Search ............... 137/13; 252/8.51, 8.511

[56] References Cited

U.S. PATENT DOCUMENTS

| 3,572,354 | 3/1971 | Tinsley | 137/13 |
| 3,826,279 | 7/1974 | Verschuur . | |
| 4,325,397 | 4/1982 | Lofquist . | |
| 4,358,572 | 11/1982 | Mack | 137/13 |

Primary Examiner—Alan Cohan
Attorney, Agent, or Firm—C. R. Schupbach

[57] ABSTRACT

Method for reducing pressure drop in a conduit carrying a viscous drag reducing material by injecting a lower viscosity liquid which is immiscible with the drag reducing material at the periphery of the conduit to form a flowing annular layer of such lower viscosity liquid thereby reducing the pressure drop in the conduit.

13 Claims, No Drawings

METHOD FOR REDUCING PRESSURE DROP IN THE TRANSPORTATION OF DRAG REDUCER

BACKGROUND AND SUMMARY OF THE INVENTION

Drag (or friction loss) reducing materials have been addressed extensively in the literature and in patents. Water soluble drag reducers have been used in hydraulic fracturing of subterranean formations, in pipelining of aqueous streams in plants and refineries, in storm sewers, firefighting hoses, sprinkler systems, etc. Oil soluble drag reducers have been used primarily in the transportation of hydrocarbon oils, such as crude oil, through long distance pipelines. Other uses have been proposed, particularly in plants and refineries. Certain uses in offshore petroleum production would be feasible provided that drag reducers, which are usually high molecular weight, viscous materials could be delivered to the locations of desired use.

According to this invention the pressure drop in a conduit flowing a viscous drag reducing material is greatly reduced by injecting into the periphery of the conduit a liquid material which is immiscible with the drag reducing material and of substantially lower viscosity in a sufficient amount to form a flowing layer of such liquid material on the inner walls of the conduit.

In one aspect of the invention the process is carried out to provide a supply of drag reducer without excessive pressure drop through a small diameter circular conduit which is normally used to provide low viscosity chemicals to subsea oil well completions, which may be substantial distance from shore.

PRIOR ART

U.S. Pat. No. 4,325,397 to Lofquist relates to a method for reducing pressure drop in polyamide process piping by injecting linear polyethylene glycol around the periphery of the pipeline, thereby forming a coating on the internal pipe wall to lubricate the flowing polyamide. The polyethylene glycol is immiscible with the polyamide and forms an annular film on the interior surface of the piping.

U.S. Pat. No. 3,826,279 to Verschuur discloses apparatus for the transport of a viscous liquid surrounded by an annular layer of a liquid with lower viscosity. The two liquids are mutually insoluble.

DETAILED DESCRIPTION OF THE INVENTION

Subsea completions in offshore operations have been carried out for many years. The original purpose of subsea completions was to eliminate the necessity for a production platform. This goal has not been realized, however, and most subsea completions are associated with a production platform rather than delivering oil directly to the shore. There are a number of reasons for this, one of which is the difficulty in pumping large volumes of oil substantial distances under water particularly in cold water areas. Even when the oil production is transported the relatively short distances which are required to reach a production platform, the pressure drops encountered in the oil transport lines carrying materials in one, two and three phase flow are substantial and can either limit production from the subsea completion or require the installation of expensive pumps to increase the transfer line capacity.

The friction loss problem associated with undersea crude transfer lines could be obviated at least in part by providing a drag reducer to the subsea completion. The drag reducer would substantially reduce the friction drop due to the flowing crude and allow pumping of substantially more crude with the same pressures or allow reduction of pressure in carrying out the transfer.

Unfortunately, the problem of transporting oil from a subsea completion is minor compared to the difficulty in transferring a drag reducer to a subsea completion. The most effective drag reducers are usually high molecular weight, high viscosity materials. As a result extremely high pressures are required to transfer drag reducers through a conduit even for short distances and even in a conduit of substantial size. In the usual subsea completion a large conduit is not available to transfer material to the undersea wellhead. However, in most if not all subsea completions, there is provided a small conduit, usually not more than one inch in diameter, which is used for supplying various chemicals to the subsea completion. In some operations, chemical supply lines may be as small as ½ inch or as large as 2 or 3 inches, or even as large as 5 inches or more in diameter. The chemical supply line may originate on a production platform or may be run from shore in which case it may be several miles or more in length and up to as much as ten or twenty miles long.

In the method of this invention such a small line may be used to supply drag reducer to the subsea completion. In carrying out the invention a material which is immiscible with the drag reducer and of substantially lower viscosity is introduced to the periphery of the small conduit. At the same time flow of drag reducer is commenced into the conduit. The lower viscosity material forms a film on the inner walls of the conduit which flows along the length of the conduit and the drag reducer forms a continuous rope like material which flows down the center of the conduit and is not in contact with the conduit walls. As a result, the pressure drop of the combined flowing stream is substantially reduced over that which would exist with the drag reducer alone.

The pressure drop required to pass a drag reducer through a one inch line from a production platform to a subsea completion could exceed 10,000 to 20,000 pounds per square inch or even higher. Such pressures, of course, are not feasible for the type of conduits which are normally used in oil well production systems. By using the method of this invention, it is possible to bring about a reduction in friction loss of as much as 75% to 85% or more. This would allow the introduction of a drag reducer to a subsea completion from a production platform with pressures as low as 1,000 to 2,000 pounds per square inch or even lower. The use of the method of this invention becomes particularly significant when the line to be used runs from the shore to the subsea completion and is as much as a mile or more in length.

The drag reducers provided to subsea completions in this aspect of the invention are oil soluble. Therefore, the material used to form the low viscosity flowing film is usually a polar material which is substantially immiscible with the drag reducer. However, other materials, which are not polar, may also be used as long as they are substantially immiscible with the drag reducer. As used herein the term "substantially immiscible" is intended to include also materials in which the drag reducer may slowly dissolve. Such materials find particular use when the conduit carrying the drag reducer is relatively short in length and the drag reducer is in contact with the flowing film material for a relatively short period of time. A variety of compounds and other materials may be used to form the flowing film including such immiscible (polar) materials as water; alcohols, such as butanol and hexanol; and glycols, such as ethylene glycol and propylene glycol. Also included are hydrocarbon materials in which the drag reducer dissolves slowly, such as diesel oil, kerosine and naphtha.

Other materials may be included as desired with the drag reducer or the film forming material, such as corrosion inhibitors, etc. Usually such added materials are provided only in small amounts.

Oil soluble drag reducers which are used in the method of the invention include but are not limited to such materials as polyiosbutylene, polyacrylates, polystyrene derivatives, polydimethylsiloxane, polyisopreme, polybutadiene, cyclopentene polymers and copolymers of cyclopentene with other ethylenically unsaturated hydrocarbons such as isobutene, octene, butadiene and isoprene. Particularly desirable drag reducers are high molecular weight non-crystalline hydrocarbon soluble polyolefin homopolymers and copolymers in which the olefin monomers may contain from 2 to 30 carbon atoms. All of the various drag reducing materials and their methods of preparation are well known in the art. For example, U.S. Pat. No. 4,493,903 to Mack discloses a method for producing ultra high molecular weight oil soluble non-crystalline polymers of alpha-olefins.

The drag reducers may have molecular weights ranging from 250,000 to as high as 5 to 10 million or higher. Usually more effective drag reduction is obtained with higher molecular weight material. Polyolefin drag reducers preferably have an inherent viscosity of about 9 to about 18 deciliters/gm which equates to a molecular weight of about $1 \times 10^6$ to about $30 \times 10^6$.

The viscosity of the material which forms the flowing film in the conduit carrying the drag reducer is much lower than that of the drag reducer. Usually it is between about 0.5 and about 30 cp; however, it is within the scope of the invention to use materials having any viscosity which is lower than that of the drag reducer employed. The amount of film forming material used will vary depending on the particular combination of the drag reducer and carrying compound. Usually the film forming material is provided in an amount between about 1 volume percent and about 50 volume percent based on the drag reducer and preferably between about 5 volume percent and about 25 volume percent.

While the invention has been described by reference to the preferred embodiment which is providing drag reducer to subsea completions, it also finds application in other uses where it is desired to provide drag reducer to a hydrocarbon stream flowing in a conduit, where the conduit available for transmission of the drag reducer is small or is extended in length or is subject to conditions of low temperature.

In addition to the transfer of oil soluble drag reducers, the invention may be applied to the movement of water soluble drag reducers through conduits. As pointed out previously, water soluble drag reducers have been used for a number of purposes including hydraulic fracturing and pipelining of aqueous streams in plants and in refineries; also in the transmission of aqueous materials in firefighting hoses, sprinkler systems, and in storm sewers. In any or all of these systems the method of this invention may be employed to move the drag reducer from the point of availability to the location where its use is desired.

Numerous water soluble drag reducing agents and their methods of preparation have been disclosed in the art. They include such materials as polyethylene oxide, polyacrylamide, partially hydrolized polyacrylamide, hygroscopic drag reducing powders such as guar gum, karaya gums, xanthan gum, sodium carboxyethylcellulose, methylcellulose, natural gums, carboxyvinyl polymers with vinyl acrylamides, carboxymethylcellulose, and hydroxyethylcellulose. Also sodium silicate or silicate salts of polyvalent metals such as calcium, magnesium, iron or aluminum, polyvalent salts of acrylic acids such as calcium or magnesium acrylate and sodium salt of acrylic emulsion. Another class of water soluble drag reducers is polymers of monoalkene aromatic sulfonates.

The water soluble drag reducers also include various copolymers of acrylamide with such materials as alkyl-poly (etheroxy) acrylates, methylpropane sulfonic acid, N-(3-sulfopropyl-N-methacroyloxyethyl-N,N-dimethyl-ammonium betaine (VI), quaternary salts of dimethylaminoethyl methacrylate and dimethylaminopropyl methacrylamide, poly (dimethylamino methylacrylamide), (3-acrylmido-3-methyl) butyltrimethylammonium chloride, 2-acrylamido-2-methylpropane sulfonic acid, and dimethyldiallyl ammonium chloride or other diallyl ammonium compounds.

In addition there are also disclosed as water soluble drag reducers a mixture of a cationic copolymer having a nonionic water soluble polymer backbone and an antionic copolymer having a nonionic water soluble polymer backbone in which the water soluble polymer backbone may be acrylamide. Also disclosed are terpolymers of acrylamide, methyl styrene sulfate and methacrylmidopropyltrimethylammonium chloride. Also disclosed are copolymers of acrylamide and vinyl sulfonic acid. Another group of drag reducers and polymers obtained by the radiation polymerization of acrylamide, methacrylamide, acrylic acid, methacrylic acid, alkali metal acrylate, alkali metal methacrylate and mixtures thereof. Another water soluble drag reducer is a mixture of a visco-elastic cationic surfactant and an organic electrolite such as cetyltrimethylammonium salicylate and sodium salicylate; cetyltrimethylammonium 3,4,-dichlorobenzoate and sodium 3,4-dichlorobenzoate; and tetradecyltrimethylammonium salicylate and sodium salicylate. Another drag reducer is formed by the reaction product of a hydroxy ether and a pentavalent phosphorous compound with a short chain and or long chain alcohol. Drag reduction is also obtained by a mixture of a polymer having a plurality of linear paraffinic C18+ side chains and a copolymer of ethylene and an ethylenically unsaturated compound having no such side chains. Another drag reducer is polyethylene oxide alcohol surfactant containing from about 12 to about 18 carbon atoms and about 3 to about 9 ethylene oxide units. Also disclosed are various ethylene oxide polymers in water soluble organic or inorganic compounds and various surface active agents.

Any of the above mentioned or other water soluble drag reducers may be used in carrying out the invention. The lower viscosity material employed with water soluble drag reducers are nonpolar and are immiscible with such drag reducers. Examples of such nonpolar materials are generally organic solvents, including such materials as saturated and unsaturated hydrocarbons, as non-exhaustively represented by hexane, benzene, and mixtures thereof; liquified petroleum gases; gasoline; diesel oil and kerosine.

As in the case of the oil soluble drag reducers, usually the higher the molecular weight of the water soluble drag reducer the greater its effect on drag reduction. The amount of nonpolar material used with the water soluble drag reducer is in the same range as disclosed for the combination of polar materials and oil soluble drag reducers.

The invention has been particularly described in conjunction with subsea oil well completions where the conduits employed are circular. It is within the scope of the invention, however to transport drag reducers through conduits of non-circular cross-section, such as oval shaped conduits, square conduits, rectangular conduits or other multi-walled conduits, while utilizing the process of the invention.

The following examples are presented in illustration of the invention.

EXAMPLES

Ethylene gylcol and polydecene drag reducer having an inherent viscosity of 14.5 were pumped simultaneously through a one inch schedule 80 carbon steel line having an inside diameter of 0.97 inches and a length of 39 feet and 10 inches. The tests were carried out at various ratios of glycol and drag reducer and at various flow rates. The results of the test are shown in the following table.

TABLE

| Flow Rate - GPM | | Percent Flow | | Pressure Drop | Percent Drag |
|---|---|---|---|---|---|
| Glycol | DR | Glycol | DR | psi/Ft | Reduction |
| 0.025 | 0.00 | 100 | 0 | 0.0003 | — |
| 0.200 | 0.00 | 100 | 0 | 0.0007 | — |
| 0.400 | 0.00 | 100 | 0 | 0.0007 | — |
| 0.000 | 0.05 | 0 | 100 | 0.8773 | — |
| 0.025 | 0.05 | 33 | 67 | 0.1410 | 83.9 |
| 0.000 | 0.10 | 0 | 100 | 0.8311 | — |
| 0.025 | 0.10 | 20 | 80 | 0.1634 | 80.3 |
| 0.100 | 0.10 | 50 | 50 | 0.1341 | 83.9 |
| 0.200 | 0.10 | 67 | 33 | 0.1221 | 85.3 |
| 0.400 | 0.10 | 80 | 20 | 0.1273 | 84.7 |
| 0.000 | 0.15 | 0 | 100 | 0.7850 | — |
| 0.000 | 0.20 | 0 | 100 | 0.7573 | — |
| 0.025 | 0.20 | 11 | 89 | 0.1651 | 78.2 |
| 0.200 | 0.20 | 50 | 50 | 0.1290 | 83.0 |
| 0.400 | 0.20 | 67 | 33 | 0.1204 | 84.1 |
| 0.000 | 0.25 | 0 | 100 | 0.7400 | — |
| 0.025 | 0.25 | 9 | 91 | 0.1685 | 77.0 |

It is apparent from the results of the test that a significant reduction in the frictional pressure loss of polydecene drag reducer can be achieved by coinjecting an immiscible fluid with the drag reducer. During the test the two fluids remained separated in the line cheating an annular flow pattern with the glycol fluid around the outside "wetting" the drag reducer. Throughout the test the drag reducer string remained intact showing no signs of breaking. The drag reducer was physically separated from the discharge stream and was noticeably less sticky than the drag reducer which had not been contacted with ethylene glycol.

It is of interest to note that with the maximum flow rate of glycol and drag reducer which occurred in the run in which the flow rate of the glycol was 0.4 gallons per minute and the drag reducer 0.2 gallons per minute both the drag reducer and glycol were in laminer flow. Thus it is not necessary to provide turbulent flow of the polar material in order to obtain the desirable effects of the method of the invention.

We claim:

1. A method for reducing the pressure drop in a conduit flowing a viscous drag reducing material which comprises injecting into the conduit at the periphery thereof a liquid material of lower viscosity substantially immiscible with the viscous drag reducing material in a sufficient amount to form a flowing layer of such liquid material on the walls of the conduit.

2. The method of claim 1 in which the drag reducing material is water soluble.

3. The method of claim 1 in which the drag reducing material is oil soluble.

4. The method of claim 3 in which the drag reducer is a high molecular weight non-crystalline hydrocarbon soluble polyolefin.

5. The method of claim 4 in which the lower viscosity liquid material is selected from polar materials, such as alcohols and glycols and hydrocarbon materials in which the drag reducer dissolves slowly.

6. The method of claim 5 in which the lower viscosity liquid material is ethylene glycol.

7. The method of claim 6 in which the ethylene glycol constitutes from about 1 volume percent to about 50 volume percent of the polyolefin drag reducer.

8. The method in which oil is produced from a subsea completion through a pipeline and chemicals are introduced to the subsea completion through a small diameter circular conduit which is of sufficient length that excessive pressure drop is required to transport oil soluble viscous drag reducer through such conduit, the improvement which comprises injecting into the conduit at the periphery thereof, while transporting the viscous drag reducer therethrough, a liquid material of lower viscosity and substantially immiscible with the drag reducer in a sufficient amount to form a flowing annular layer of such material in the conduit, whereby the drag reducer may be provided to the subsea completion without excessive pressure drop.

9. The method of claim 8 in which the oil soluble drag reducer is a high molecular weight non-crystalline hydrocarbon soluble polyolefin.

10. The method of claim 9 in which the lower viscosity liquid material is selected from polar materials, such as alcohols and glycols and hydrocarbon materials in which the drag reducer dissolves slowly.

11. The method of claim 10 in which the lower viscosity liquid material is ethylene glycol.

12. The method of claim 10 in which the lower viscosity liquid material is at least one material selected from the group consisting of hexane, benzene, gasoline, diesel oil, and kerosene.

13. The method of claim 10 wherein the lower viscosity liquid material is diesel oil.

* * * * *